US005956135A

United States Patent [19]

Quesnel

[11] Patent Number: 5,956,135

[45] Date of Patent: Sep. 21, 1999

[54] PIPELINE INSPECTION APPARATUS

[76] Inventor: Ray J. Quesnel, P.O. Box 129 1475 HWY 69 North, Val Caron, Canada, P3N 1N6

[21] Appl. No.: 08/963,548

[22] Filed: Nov. 3, 1997

[51] Int. Cl.[6] .......... G01N 21/00; H04N 7/18; F16L 55/18

[52] U.S. Cl. .......... 356/241; 348/84; 138/97

[58] Field of Search .......... 356/153, 241, 356/399, 400; 358/100; 138/97

[56] References Cited

U.S. PATENT DOCUMENTS

| | | | |
|---|---|---|---|
| 2,096,073 | 10/1937 | Spencer . | |
| 2,634,974 | 4/1953 | Chuy . | |
| 2,863,659 | 12/1958 | Chuy . | |
| 3,854,645 | 12/1974 | Knights | 226/162 |
| 4,197,908 | 4/1980 | Davis et al. | 166/55 |
| 4,372,161 | 2/1983 | de Buda et al. | 73/432 |
| 4,601,204 | 7/1986 | Fournot et al. | 73/432 |
| 4,646,787 | 3/1987 | Rush et al. | 138/98 |
| 4,651,558 | 3/1987 | Martin et al. | 73/40.5 |
| 4,654,702 | 3/1987 | Tolino et al. | 358/100 |
| 4,677,472 | 6/1987 | Wood | 358/100 |
| 4,722,001 | 1/1988 | Röhrich et al. | 358/100 |
| 4,991,006 | 2/1991 | Wood | 358/100 |
| 5,090,259 | 2/1992 | Shishido et al. | 73/866.5 |
| 5,099,115 | 3/1992 | Cruickshank | 356/241 |
| 5,195,392 | 3/1993 | Moore et al. | 73/866.5 |
| 5,745,232 | 4/1998 | Hasegawa | 356/153 |

*Primary Examiner*—Frank G. Font
*Assistant Examiner*—Roy M. Punnoose
*Attorney, Agent, or Firm*—Baker & Botts, L.L.P.

[57] ABSTRACT

An apparatus for inspecting a lateral branch of a main pipeline from within the main pipeline comprises an inspection device adapted to fit within the lateral branch, a semi-rigid rod having a leading end attached to the inspection device, an aligner for aligning the inspection device with a lateral branch, and a rod pusher for advancing the rod and inspection device into the lateral branch. The rod pusher is pneumatic and pushes the inspection device into the lateral branch by repeatedly gripping, advancing, and releasing the rod.

14 Claims, 3 Drawing Sheets

26
18
24
32
42
32
40
44
38
14
36
12
30
34
48
44
50
46
54
16
52
10

PIPELINE INSPECTION APPARATUS

BACKGROUND OF THE INVENTION

1. Technical Field

This invention relates to a pipeline inspection apparatus, and in particular to an apparatus for inspecting a lateral branch of a pipeline.

2. Discussion of the Prior Art

Pipeline installations such as those for sewage generally comprise a main pipeline having lateral branches extending therefrom, for connecting individual buildings to the pipeline. Lateral branches may require inspection if, for instance, it is suspected they are damaged. If a lateral branch is damaged, there may be undesirable consequences such as contamination of ground water by leaking sewage, or infiltration of ground water into the sewage pipeline which subsequently increases the burden on sewage treatment plants. However, locating the damage is a difficult task because lateral branches are usually not straight and may be considerably long (e.g. 100 meters).

To inspect such lateral branches, a miniature inspection device such as a video camera may be attached to an end of a semi-rigid member, and the camera may be introduced and pushed into the lateral branch from an access point inside the building. This method of inspection is inconvenient because arrangements must be made with the occupants to enter the building. Moreover, the process of inspecting a number of lateral branches corresponding to a single main pipeline is inefficient because each branch must be inspected separately from within each successive building.

To overcome the above difficulties, apparatus have been proposed for remotely inspecting lateral branches from within a main pipeline. For example, U.S. Pat. No. 4,651,558 to Martin and Guthrie relates to a launcher which is pulled through a main pipeline using ropes or cables. The launcher has an aperture from which a miniature video camera may be advanced into a lateral branch. The launcher is substantially cylindrical and is rotatable about its longitudinal axis so as to align the aperture with a lateral branch of the pipeline. Once such alignment is achieved, the video camera, which is fixed to an end of a semi-rigid push rod, is advanced into the lateral branch by means of motor-driven pinch rollers contained in the launcher. The rollers grip the rod and propel it forward as they are rotated.

U.S. Pat. No. 4,677,472 to Wood describes another apparatus for advancing a miniature video camera, fixed to an end of a semi-rigid push rod, into a lateral branch of a pipeline. The apparatus, which is pulled through a main pipeline, employs a pair of motor-driven drive pulleys through which the push rod is advanced into the lateral branch. The pulleys are tiltable and rotatable so that the position from which the video camera is advanced may be aligned with a lateral branch.

There a several drawbacks of the above-described prior art apparatus. For instance, both employ motors and complex mechanical arrangements of pulleys or rollers for advancing the push rod and camera into the lateral pipe. As a result, they are limited in power and hence in the length of a lateral branch through which an inspection camera may be advanced. Further, they are bulky, and expensive to manufacture and maintain.

OBJECTS OF THE INVENTION

It is therefore an object of the invention to provide an apparatus for inspecting a lateral branch of a pipeline that is powerful, compact, and simple in design and construction.

It is a further object of the invention to provide an apparatus for inspecting a lateral branch of a pipeline wherein the inspection device is advanced into the lateral branch of the pipeline using pneumatically-driven pushing means.

SUMMARY OF THE INVENTION

The invention provides an apparatus for inspecting the inside of a conduit, comprising an inspection device adapted to fit within the conduit; a semi-rigid elongate member having a leading end attached to the inspection device; and pushing means for advancing the semi-rigid elongate member and the inspection device into the conduit. The pushing means comprises a housing through which the semi-rigid elongate member extends; a carrier disposed within the housing and biased to a first position, wherein the carrier is movable along the longitudinal axis of the housing; and an inflatable member attached to the leading end of the carrier. Upon inflation, the inflatable member grips the semi-rigid elongate member and facilitates movement of the carrier to a second position within the housing, thereby advancing the semi-rigid elongate member and the inspection device. Upon deflation, the inflatable member releases the semi-rigid elongate member, and the carrier is returned to the first position.

In another embodiment of the invention the apparatus is adapted to fit inside the conduit, the apparatus further comprising a chassis for carrying the pushing means, which is adapted for movement within the conduit.

In a preferred embodiment the apparatus is adapted for inspecting a lateral branch of a main pipeline, and the apparatus is adapted to inspect the lateral branch by advancing the inspection device and a portion of the semi-rigid elongate member into the lateral branch while the pushing means remains inside the main pipeline.

The apparatus may further comprise a chassis adapted for movement within the main pipeline for carrying the pushing means, and positioning means disposed between the chassis and the inspection device, for aligning the inspection device with the lateral branch to be inspected, wherein the pushing means advances the inspection device and a portion of the semi-rigid elongate member into the lateral branch when the inspection device is aligned with the lateral branch.

According to an embodiment of the invention, the positioning means comprises a tubular member substantially coaxial to the longitudinal axis to the pushing means, having a first open end adapted to cooperate with the leading end of the pushing means, the first open end receiving the elongate member, and a second open end for outputting the elongate member. This embodiment additionally includes a rotation means for rotating the tubular member about the longitudinal axis in discrete portions of a single revolution of the tubular member, wherein the first open end and the second open end of the tubular member are offset at an angle between about 30 and 150 degrees. In a preferred embodiment the first open end and the second open end of the tubular member are offset at an angle of about 90 degrees. The rotating means may comprise a motor such as a servo motor or a stepping motor.

In a preferred embodiment of the invention, the pushing means further comprises sealing means disposed on the carrier for providing a sliding seal between the carrier and a portion of the inside wall of the housing, so as to provide a sealed cavity between the carrier and the portion of the inside wall of the housing; pressure control means for controlling the pressure within the sealed cavity; and a spring disposed in the housing for biasing the carrier to the first position within the housing. In this embodiment, the inflatable member inflates in response to an increase in pressure in the sealed cavity within the housing, subsequently the carrier moves to the second position within the housing in response to a further increase in pressure, and the semi-rigid elongate member advances with the carrier, the pressure control means then releases the pressure, the inflatable member releases the semi-rigid elongate member in response to the release of pressure, and the spring returns the carrier to the first position within the housing.

In a preferred embodiment of the invention the pressure is air pressure, and the pressure control means comprises a pressure inlet and a pressure relief valve. The inflatable member preferably comprises a rubber bladder.

The inspection device is expediently a video camera and a light, in which case the semi-rigid elongate member is adapted to house electrical cables associated with the video camera and the light. A video camera and a light are also expediently disposed at the leading end of the chassis.

BRIEF DESCRIPTION OF THE DRAWINGS

Embodiments of the invention will now be described, by way of example, with reference to the accompanying drawings, wherein.

DESCRIPTION OF THE PREFERRED EMBODIMENTS

Figure 1:
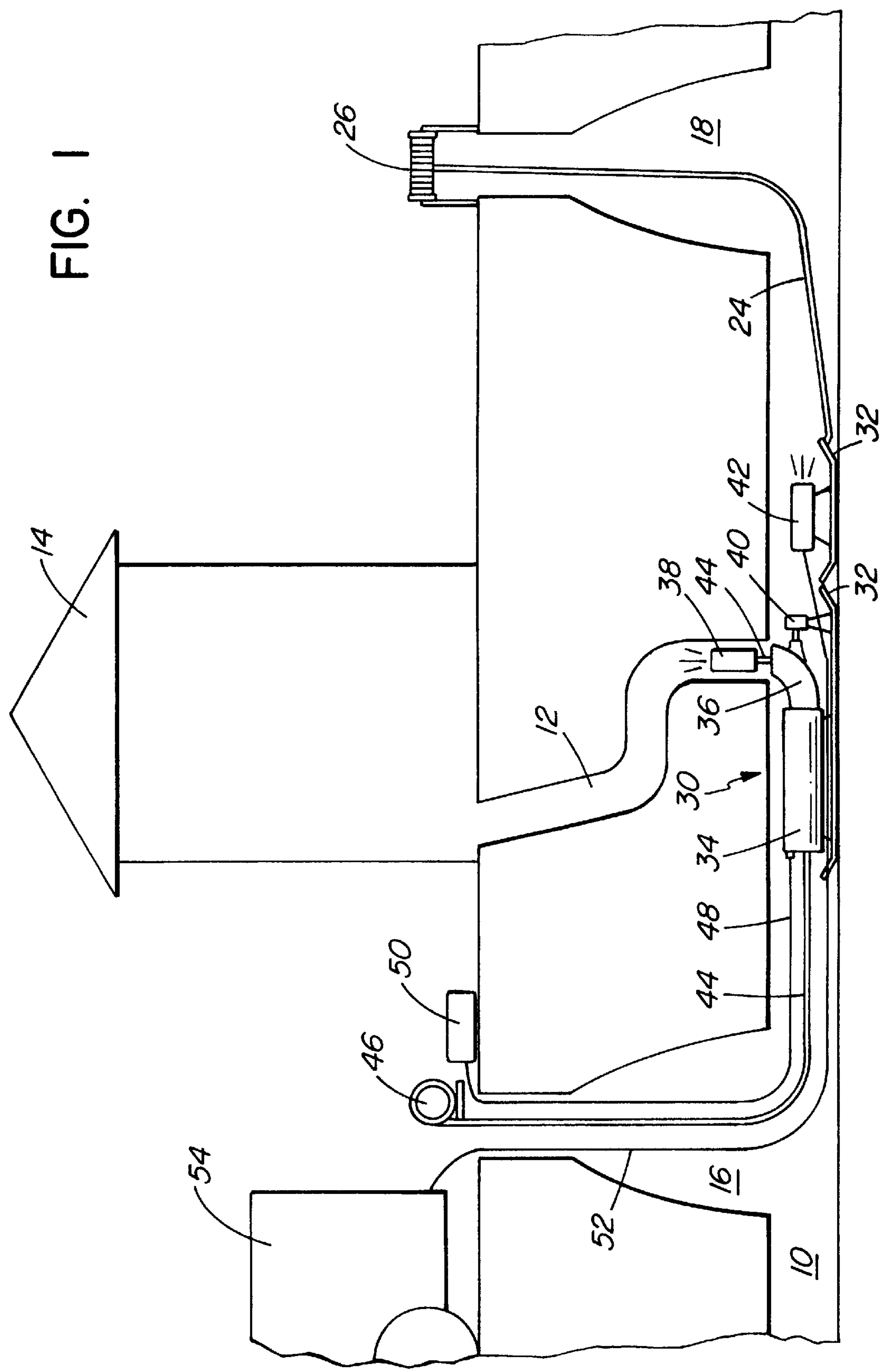
FIG. 1 is a schematic diagram of a pipeline inspection apparatus according to the invention in use.

As shown in FIG. 1, a typical pipeline installation such as that used for sewage disposal comprises a main pipeline 10, and a plurality (one is shown) of lateral branches 12. Each lateral branch services a building 14. Manholes 16, 18 are disposed at various distances along the main pipeline 10, and provide access thereto.

By utilizing the manhole 16, a pipe inspection apparatus according to the invention, generally referred to by reference numeral 30, is placed within the main pipeline 10. The apparatus 30 is mounted on a chassis having skids 32. A winch 26 is disposed over the manhole 18, and a cable 24 extends from the winch 26 to the apparatus 30, to pull the apparatus 30 through the main pipeline 10.

Apparatus 30 comprises rod pusher 34, aligner 36, and miniature video camera 38. As shown in FIG. 1, the camera 38 is small enough to fit inside the lateral branch 12. The camera 38 is fixed to a leading end of a semi-rigid rod 44, which extends from a reel 46 located above the manhole 16, and passes through the pusher 34 and the aligner 36. Electrical cables associated with the inspection camera 38 are housed in the rod 44, and are connected to video and electrical equipment in an inspection vehicle 54. Apparatus 30 further includes a motor 40 for rotating the aligner 36 about a longitudinal axis of the pusher 34, and a large video camera 42. Electrical cables associated with the large video camera 42 and the motor 40 are connected to equipment in the inspection vehicle 54 via cable 52. Information from the camera 42 is used to guide the movement of the apparatus 30 within the main pipeline 10, while information from the camera 38 is used to inspect the lateral branch 12. Either or both cameras 38, 42 may be equipped with lamps for illuminating the inside of the pipeline and/or the lateral branch.

In accordance with a preferred embodiment of the invention, the rod pusher 34 is operated with air pressure. Thus, as shown in FIG. 1, an air compressor 50 is disposed outside the manhole 16, and supplies compressed air to the pusher 34 via air hose 48.

In operation, the apparatus 30 is installed in a main pipeline 10 as shown in FIG. 1. As the apparatus 30 is drawn through the main pipeline 10 using the winch 26, a lateral branch 12 will first be observed in the video image obtained from camera 42. Up to this point miniature camera 38 is substantially withdrawn into the aligner 36 so that movement of the apparatus 30 within the main pipeline 10 is facilitated. Video images obtained from camera 38 assist in positioning the apparatus 30 such that the camera 38 within the aligner 36 is proximal to the lateral branch 12, and the aligner 36 is then rotated so as to align the camera 38 with the longitudinal orientation of the lateral branch 12. The pusher is then activated, and the rod 44 and camera 38 are advanced into the lateral branch 12. When inspection of a lateral branch is complete, the rod 44 and camera 38 are withdrawn therefrom by winding the rod 44 onto the reel 46. The apparatus 30 may then be advanced along the main pipeline 10 using the winch 26, to inspect another lateral branch, or to remove the apparatus 30 through the manhole 18.

Figure 2:
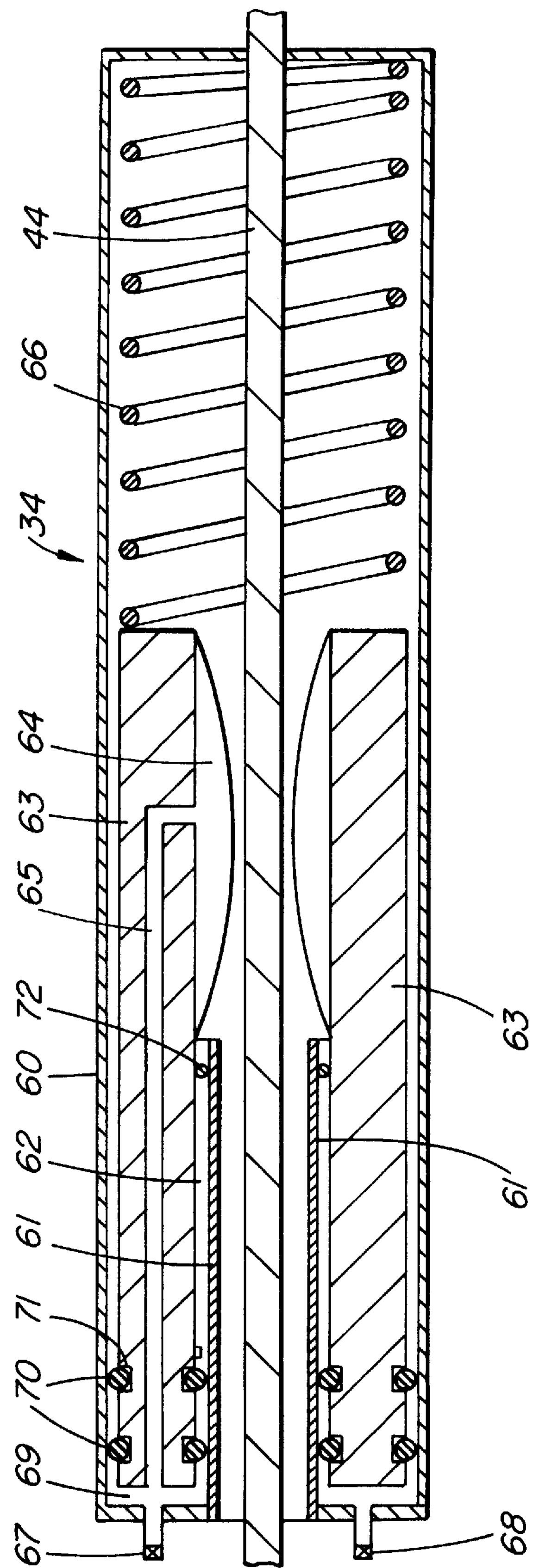
FIG. 2 is a longitudinal section of a rod pusher according to the invention.

A preferred embodiment of the pusher 34, shown in longitudinal section in FIG. 2, will now be described. The pusher 34 comprises a generally cylindrical housing 60 having a substantially coaxial inner cylindrical wall 61 disposed at a lagging end thereof, so as to form a cavity 62. A generally cylindrical carrier 63 is disposed in the cavity 62 and is adapted for coaxial sliding movement therein. The cavity 62 is divided into a subcavity 69 by a plurality of seals 70 provided in annular grooves 71 a on lagging end of the carrier 63. Coil spring 66 is provided in a leading end of the housing 60 and is in contact with a leading end of the carrier 63. An inflatable rubber bladder 64 is disposed on an inner surface of the carrier 63, and a passage 65 through the carrier 63 connects the bladder 64 with the subcavity 69. The pusher 34 further includes a connector 67 for an air hose, and a pressure relief valve 68, both of which open into the subcavity 69. As can be seen from FIG. 2, the semi-rigid rod 44 passes through, and is substantially coaxial with, the housing 60 and the carrier 63, bladder 64, and spring 66.

Operation of the pusher 34 will now be described with reference to FIG. 2. Air is supplied under pressure to the subcavity 69 via an air hose (not shown) connected to the connector 67. Air enters the bladder 64 via the passage 65 in the carrier 63, which causes the bladder to expand and grip the rod 44. As air pressure in the subcavity 69 increases, the carrier 63 is pushed toward the leading end of the housing 60, carrying the bladder 64 and hence the rod 44 with it, and compressing the spring 66. As a maximum air pressure is reached, the carrier 63 is fully displaced toward the leading end of the housing 60, the displacement being limited by a stopper 72 disposed in the inner wall 61. At this point the spring 44 is substantially fully compressed. The maximum air pressure is set by pressure relief valve 68, which, when the maximum pressure is reached, temporarily opens and releases the air pressure in the subcavity 69. Consequently, the bladder 64 deflates, and the spring 66 then returns the carrier to the lagging end of the housing 60. The operation will be automatically repeated so long as the supply of air pressure is maintained. It will be appreciated that the spring 66 is of a strength suitable for returning the carrier 63 to the lagging end of the housing 60 only when the bladder 64 has released its grip on the rod 44.

In light of the above it can be seen that the rod 44 and the camera 38 attached thereto may be driven far into a lateral branch by repeating the above-described operation many times, the rod 44 and camera 38 being advanced a distance equivalent to the distance the carrier 63 is displaced toward the leading end of the housing 60 with each cycle of operation.

Figure 3:
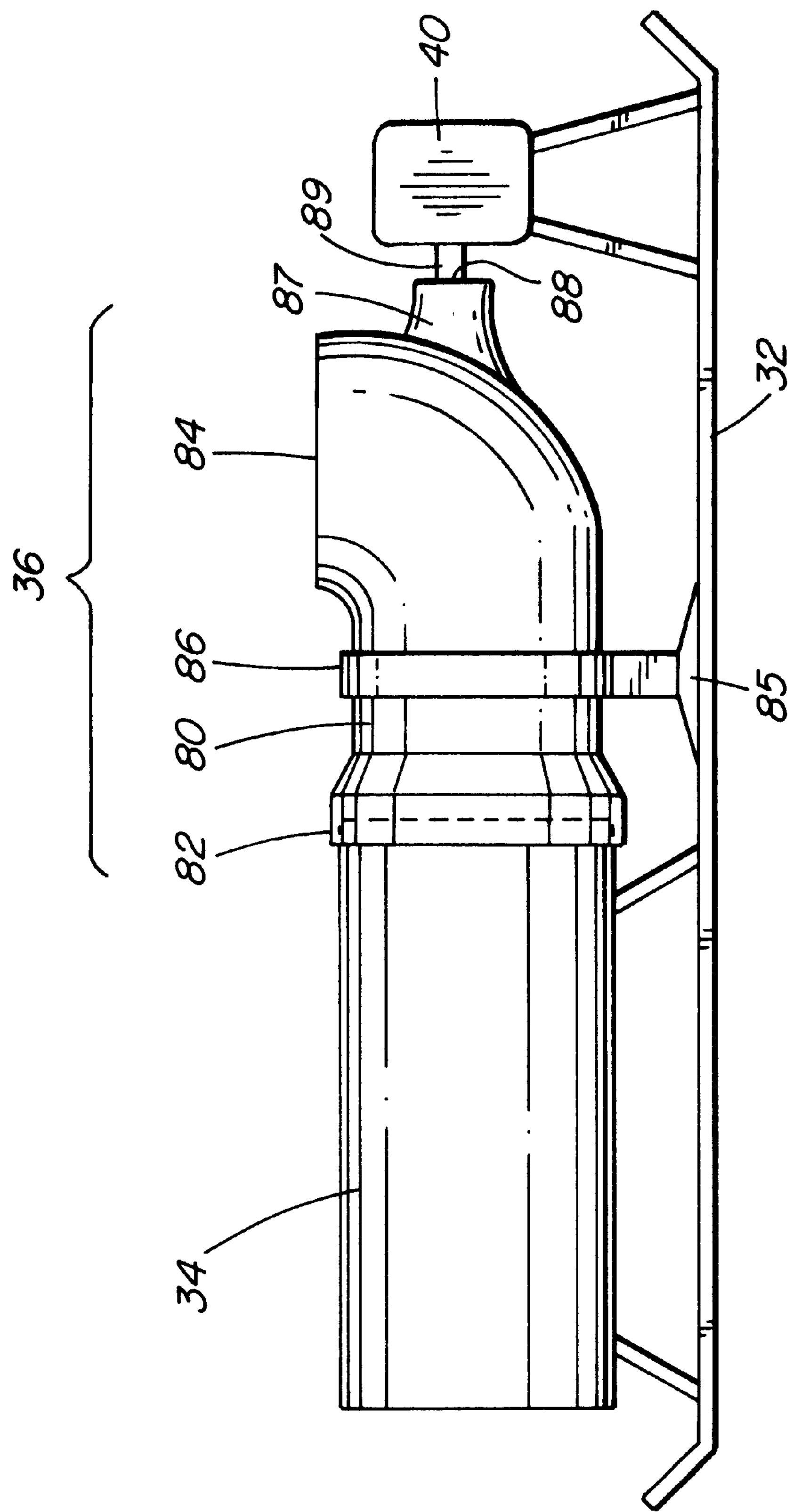
FIG. 3 is a rotating head according to a preferred embodiment of the invention.

With reference to FIGS. 1 and 3, the aligner 36 will now be described. As shown in FIG. 3, the aligner 36 consists of a tubular member in the form of an elbow 80. The elbow may be 90 degrees, or it may be any other suitable angle within a practical range of about 30 to 150 degrees. One open end 82 of the elbow 80 is adapted to cooperate with the leading end of the pusher 34, while the other end 84 may be adapted to accommodate the camera 38 therein. One or more guides (not shown) may be provided in the elbow 80 for guiding and supporting the rod 44 as it passes through the aligner 36.

The aligner 36 is mounted on the chassis 32 with a holder 85, such that the open end 82 of the elbow 80 is substantially coaxial with the pusher 34. The holder 85 is equipped with a collar 86 that permits rotation of the elbow 80, about a longitudinal axis of the open end 82, therein. The elbow 80 is further provided with a boss 87 having a bore 88 which is substantially coaxial with the longitudinal axis of the open end 82. A drive shaft 89 of the electric motor 40 can be inserted into the bore 88 and locked in place. The motor 40 may be any type of motor that permits the aligner to be rotated in discrete portions of a complete rotation, such as a servo motor or a stepping motor.

It will be apparent to those skilled in the art that the pipe inspection apparatus may be configured in other ways, to suit any particular situation. For example, use of the video camera 38 alone may be sufficient for some inspection operations. In this case the use of an aligner 36 having an elbow with an angle of curvature greater than 90 degrees, so as to point the camera more toward the direction of movement of the apparatus 30, would be beneficial. Moreover, an inspection device other than a camera may be used with the invention, such as a line marker, various types of sensors, etc.

Further, the apparatus 30 may be configured without the camera 42 and the aligner 36, so that the camera 38 will be projected ahead of the pusher 34. This configuration would be useful in situations where a first manhole was available for installing the pusher 34 in a pipeline, but a second manhole was not available for installing the winch 26, which would render the far end of a pipeline to be inspected otherwise inaccessible.

Finally, the pusher 34 may be used to propel a camera or other inspection device into a small conduit regardless of whether the pusher is itself installed within a pipeline.

Variations of the embodiments specifically illustrated and described herein may be employed without departing from the spirit and scope of the invention as described in the appended claims.

What is claimed is:

1. An apparatus for inspecting the inside of a conduit, comprising:

an inspection device adapted to fit within the conduit;

a semi-rigid elongate member having a leading end attached to the inspection device; and pushing means for advancing the semi-rigid elongate member and the inspection device into the conduit, the pushing means comprising:

a housing through which the semi-rigid elongate member extends;

a carrier disposed within the housing and biased to a first position, wherein the carrier is movable along the longitudinal axis of the housing;

an inflatable member attached to the leading end of the carrier which member, upon inflation, grips the semi-rigid elongate member and facilitates movement of the carrier to a second position within the housing, thereby advancing the semi-rigid elongate member and the inspection device;

and, upon deflation, the inflatable member releases the semi-rigid elongate member, and the carrier is returned to the first position.

2. An apparatus according to claim 1, further comprising a chassis for carrying the pushing means.

3. An apparatus according to claim 1, wherein the conduit is a lateral branch of a main pipeline, and the apparatus is adapted to inspect the lateral branch by advancing the inspection device and a portion of the semi-rigid elongate member into the lateral branch while the pushing means remains inside the main pipeline.

4. An apparatus according to claim 3, further comprising:

a chassis adapted for movement within the main pipeline and for carrying the pushing means; and positioning means disposed between the pushing means and the inspection device, for aligning the inspection device with the lateral branch to be inspected;

wherein the pushing means may advance the inspection device and a portion of the semi-rigid elongate member into the lateral branch when the inspection device is aligned with the lateral branch.

5. An apparatus according to claim 4, wherein the positioning means comprises:

a tubular member substantially coaxial to the longitudinal axis of the pushing means, having a first open end adapted to cooperate with the leading end of the pushing means, the first open end receiving the semi-rigid elongate member, and a second open end for outputting the semi-rigid elongate member; and rotation means for rotating the tubular member about the longitudinal axis in discrete portions of a single revolution of the tubular member;

wherein the first open end and the second open end of the tubular member are offset at an angle of from 30 to 150 degrees.

6. An apparatus according to claim 5, wherein the first open end and the second open end of the tubular member are offset at an angle of about 90 degrees.

7. An apparatus according to claim 5, wherein the rotating means comprises a servo motor.

8. An apparatus according to claim 5, wherein the rotating means comprises a stepping motor.

9. An apparatus according to claim 1, wherein the pushing means further comprises:

sealing means disposed on the carrier for providing a sliding seal between the carrier and a portion of the inside wall of the housing, so as to provide a sealed cavity between the carrier and the portion of the inside wall of the housing;

pressure control means for controlling the pressure within the sealed cavity; and a spring disposed in the housing for biasing the carrier to the first position within the housing;

wherein the inflatable member inflates in response to an increased in pressure in the sealed cavity within the housing, subsequently the carrier moves to the second position within the housing in response to a further increase in pressure, and the semi-rigid elongate member advances with the carrier, the pressure control means then releases the pressure, the inflatable member releases the semi-rigid elongate member in response to the release of pressure, and the spring returns the carrier to the first position within the housing.

10. An apparatus according to claim 9, wherein the pressure is air pressure and the control means comprises a pressure inlet and a pressure relief valve.

11. An apparatus according to claim 8, wherein the inflatable member comprises a rubber bladder.

12. An apparatus according to claim 1, wherein the inspection device comprises a video camera and a light.

13. An apparatus according to claim 12, wherein the semi-rigid elongate member is adapted to house electrical cables associated with the video camera and the light.

14. An apparatus according to claim 2, further comprising a video camera and a light disposed at the leading end of the chassis.

* * * * *